US005600620A

United States Patent [19]
Ohguri

[11] Patent Number: 5,600,620
[45] Date of Patent: Feb. 4, 1997

[54] OPTICAL HEAD APPARATUS HAVING MEANS TO ELIMINATE NOISE CAUSED BY SIDE-LOBES

[75] Inventor: Osamu Ohguri, Tokyo, Japan

[73] Assignee: NEC Corporation, Tokyo, Japan

[21] Appl. No.: 555,136

[22] Filed: Nov. 8, 1995

[30] Foreign Application Priority Data

Nov. 8, 1994 [JP] Japan .................................. 6-273297
Nov. 11, 1994 [JP] Japan .................................. 6-277804

[51] Int. Cl.$^6$ ................................................. G11B 7/135
[52] U.S. Cl. ........................... 369/112; 369/116; 369/118
[58] Field of Search ................................... 369/112, 120, 369/32, 116, 118, 100, 109, 13, 110, 44.12, 103

[56] References Cited

U.S. PATENT DOCUMENTS

| | | | |
|---|---|---|---|
| 5,121,378 | 6/1992 | Hirose et al. | 369/118 |
| 5,172,366 | 12/1992 | Chikuma | 369/120 |
| 5,434,840 | 7/1995 | Ezuka et al. | 369/112 |
| 5,450,376 | 9/1995 | Matsumura et al. | 369/110 |
| 5,496,995 | 3/1996 | Kato et al. | 369/44.12 |

FOREIGN PATENT DOCUMENTS

| | | |
|---|---|---|
| 2-12623 | 1/1990 | Japan . |
| 2-12624 | 1/1990 | Japan . |
| 2-195536 | 8/1990 | Japan . |

OTHER PUBLICATIONS

H. Osterberg et al., "The Resolving Power of a Coated Objective", *Journal of the Optical Society of America*, vol. 39, No. 7, Jul., 1949, pp. 553–557.

*Primary Examiner*—Georgia Y. Epps
*Assistant Examiner*—Kim-Kwok Chu
*Attorney, Agent, or Firm*—Sughrue, Mion, Zinn, Macpeak & Seas

[57] ABSTRACT

An optical head apparatus includes a light source, an optical modulation unit, an objective lens, a reflected beam condensing unit, and a photodetection unit. The light source emits a light beam. The optical modulation unit modulates one of a light intensity and a phase in a section of the light beam from the light source and adjusts a generation position of a side lobe light beam of the light beam. The optical modulation unit has at least a first strip-like light-shielding area inclined by a first predetermined angle with respect to a vertical axis in the section of the light beam. The objective lens focuses the light beam from the optical modulation unit to form a small spot on a recording medium. The reflected beam condensing unit condenses a reflected beam from the small spot on the recording medium. The photodetection unit detects the reflected beam from the reflected beam condensing unit to reproduce information.

12 Claims, 10 Drawing Sheets

OPTICAL HEAD APPARATUS HAVING MEANS TO ELIMINATE NOISE CAUSED BY SIDE-LOBES

BACKGROUND OF THE INVENTION

The present invention relates to an optical head apparatus and, more particularly, to an optical head apparatus which is applied to an information recording/reproducing apparatus for recording/reproducing information in/from a recording medium by using a light beam, and increases the recording density by using a super-resolution technique.

In an information recording/reproducing apparatus for recording/reproducing information in/from, e.g., a disk-like recording medium by using a light beam in accordance with a change in shape, optical characteristics, or magnetic characteristics, an increase in recording density is required to increase the memory capacity. To increase the recording density, the diameter of a light spot formed on the recording medium (to be referred to as an optical disk hereinafter) is effectively reduced.

The light spot is formed on the optical disk by condensing a laser beam by an objective lens (condenser lens). For this reason, the diameter of the light spot is proportional to $\lambda/NA$ and cannot be smaller than this value (diffraction limit value) where $\lambda$ is the wavelength of the incident laser beam, and NA is the numerical aperture of the objective lens. Therefore, development of semiconductor lasers serving as a light source has been progressed to shorten the wavelength $\lambda$ of the laser beam for reduction of the diameter of the light spot. In addition, the numerical aperture NA of an objective lens is made as large as possible.

However, there almost reaches a limitation in shortening the wavelength of a semiconductor laser or increasing the NA of an objective lens. Hence, in recent years, a super-resolution technique has been studied as a spot diameter reducing technique. The super-resolution technique is conventionally known as a technique for making the light spot size smaller than the diffraction limit value by decreasing the light intensity at the central portion of a light beam and condensing the light beam by an objective lens ("The Resolving Power of a Coated Objective", by H. Osterberg et al., Journal of the Optical Society of America, Vol. 39, No. 7, pp. 553–557, July 1949).

Various optical head apparatuses have been conventionally proposed in which the super-resolution technique is applied to an optical head apparatus to allow recording/reproduction beyond the diffraction limit value (e.g., Japanese Patent Laid-Open No. 2-12623 or 2-12624). In addition, an optical head apparatus has been conventionally proposed which uses, as a technique for modulating the light intensity of a laser source, a cross-shaped light-shielding plate to obtain the super-resolution effect for reducing the spot size in both the x and y directions (Japanese Patent Laid-Open No. 2-195536).

Figure 10:
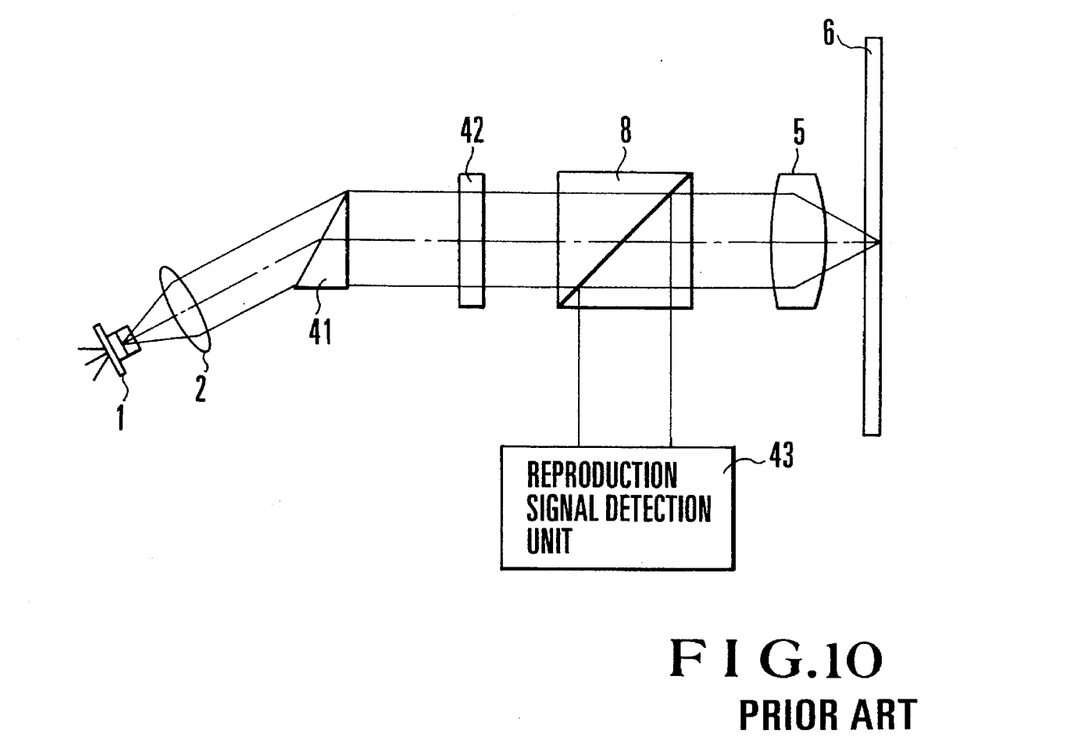
FIG. 10 is a diagram showing the arrangement of a conventional optical head apparatus.

FIG. 10 shows a conventional optical head apparatus using the super-resolution technique, which is disclosed in Japanese Patent Laid-Open No. 2-195536. The conventional optical head apparatus comprises a semiconductor laser 1, a collimator lens 2, a beam shaping prism 41, a light intensity modulator 42, a beam splitter 8, an objective lens 5, and a reproduction signal detection unit 43. A light spot is formed on the information surface of an optical disk 6.

Figure 11A:
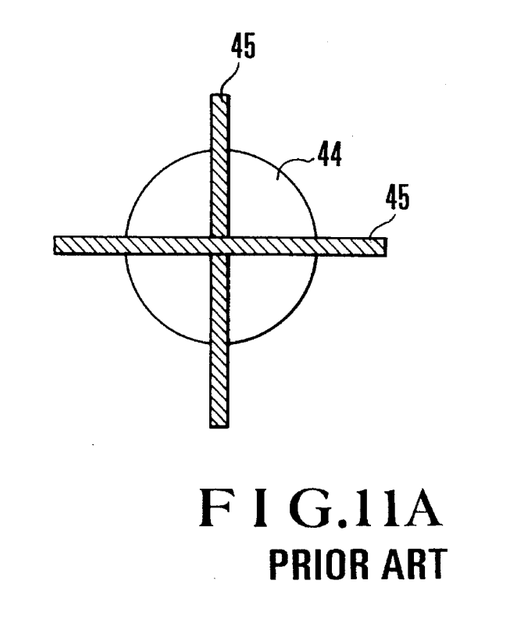
FIG. 11A is an explanatory view of a conventional optical modulator.

The operation of the conventional apparatus will be described. A laser beam emitted from the semiconductor laser 1 serving as a light source is collimated by the collimator lens 2. The laser beam is shaped by the beam shaping prism 41 and incident on the light intensity modulator 42. As shown in FIG. 11A, the light intensity modulator 42 has a structure with two light-shielding plates 45 crossing each other near the center of a beam section 44 of the incident laser beam, thereby decreasing the light intensity in a cross shape.

The laser beam extracted from the light intensity modulator 42 is transmitted through the beam splitter 8 and irradiated on the information surface of the optical disk 6 through the objective lens 5, thereby forming a small-diameter light spot. The laser beam reflected by the optical disk 6 is reflected by the beam splitter 8 through the objective lens 5 and incident on the reproduction signal detection unit 43. With this operation, a reproduction signal is reproduced.

Figure 11B:
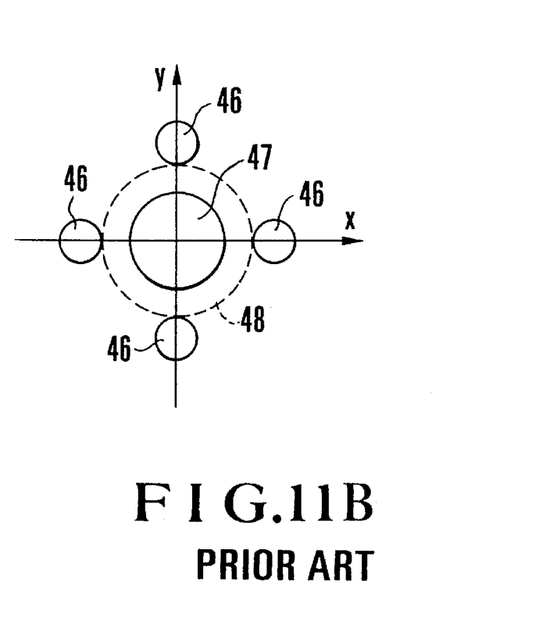
FIG. 11B is a view showing a main beam and side beams from the optical modulator shown in FIG. 11A.

In this conventional optical head apparatus, the light intensity is decreased in a cross shape by the light intensity modulator 42, as shown in FIG. 11A, and a light spot (main beam) reduced in both the x and y directions to be smaller than the diffraction limit value can be formed on the information surface of the optical disk 6, as indicated by reference numeral 47 in FIG. 11B. With this arrangement, the recording density can be increased, and at the same time, the track density in the radial direction of the optical disk 6 can also be increased. In FIG. 11B, reference numerals 46 denote side lobe light beams of the light spot, which are formed on the x- and y-axes; and 48, a light spot obtained without decreasing the light intensity.

In the conventional optical head apparatus, the light-shielding plates 45 are arranged in both the x and y directions (in the track line direction and a direction perpendicular to the track line direction) to decrease the light intensity. When the light spot is formed on the optical disk 6, the side lobe light beams 46 are generated to irradiate pits before and behind the pit currently irradiated with the light spot 47 formed by the main beam, or adjacent tracks. For this reason, noise is generated, and, a satisfactory reproduction signal cannot be obtained.

SUMMARY OF THE INVENTION

It is an object of the present invention to provide an optical head apparatus which can satisfactorily perform recording/reproduction at a high density without generating noise when a light spot smaller than a diffraction limit value determined by the wavelength of a light source and the numerical aperture of an objective lens is to be formed.

In order to achieve the above object, according to the present invention, there is provided an optical head apparatus comprising a light source for emitting a light beam, optical modulation means for modulating one of a light intensity and a phase in a section of the light beam from the light source and adjusting a generation position of a side lobe light beam of the light beam, the optical modulation means having at least a first strip-like light-shielding area inclined by a first predetermined angle with respect to a vertical axis in the section of the light beam, an objective lens for focusing the light beam from the optical modulation means to form a small spot on a recording medium, reflected beam condensing means for condensing a reflected beam from the small spot on the recording medium, and photodetection means for detecting the reflected beam from the reflected beam condensing means to reproduce information.

DESCRIPTION OF THE PREFERRED EMBODIMENTS

Figure 1:
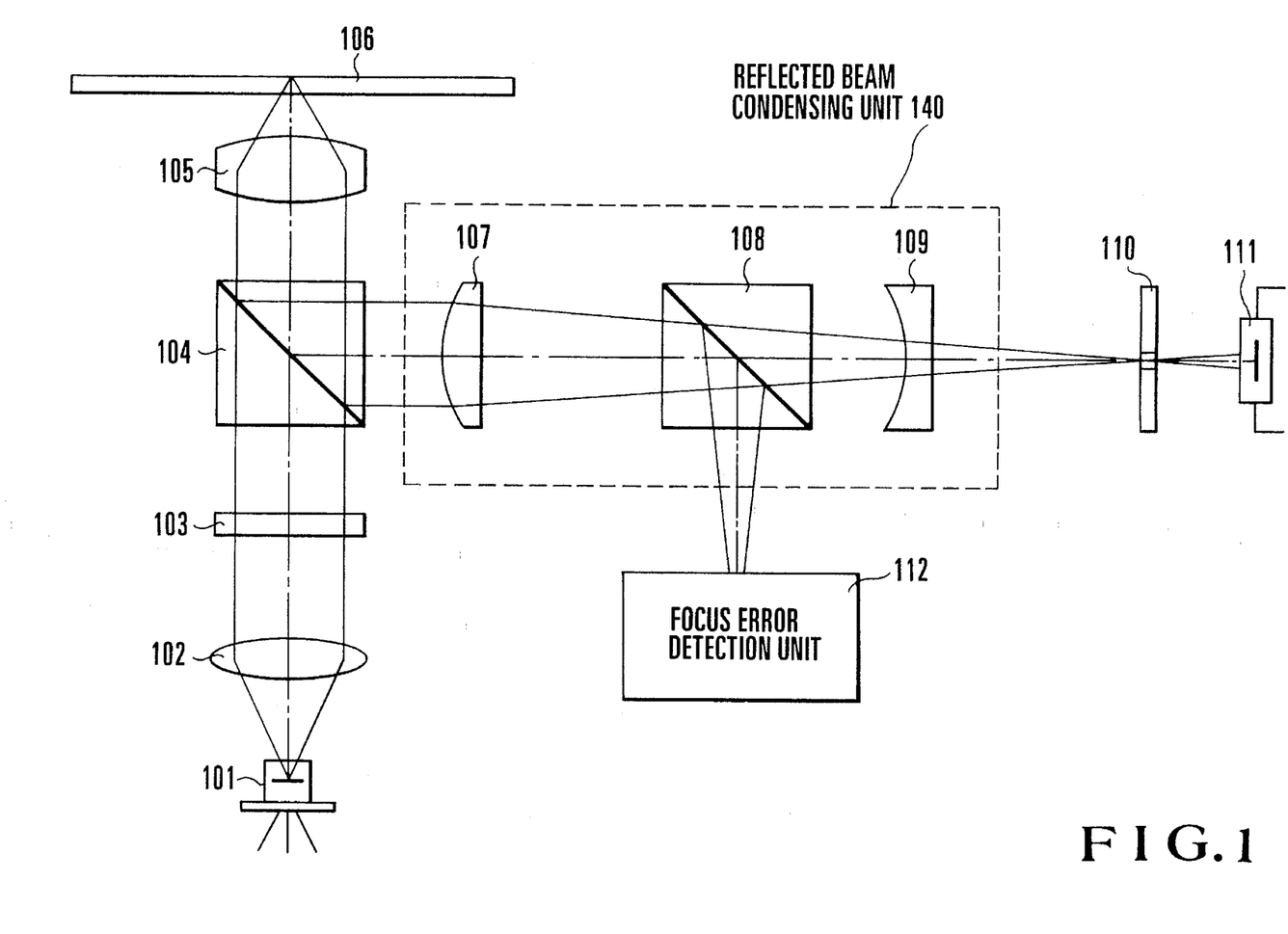
FIG. 1 is a diagram showing the arrangement of an optical head apparatus according to the first embodiment of the present invention.

Embodiments of the present invention will be described below. FIG. 1 shows an optical head apparatus according to the first embodiment of the present invention. The embodiment shown in FIG. 1 comprises a semiconductor laser 101 serving as a light source, a collimator lens 102 for collimating a light beam from the semiconductor laser 101, an optical modulator 103 for modulating the intensity or phase of the light beam from the collimator lens 102 in the beam section and adjusting the positions of side lobe light beams, an optical isolator 104 for transmitting the light beam modulated by the optical modulator 103 and changing the optical path of a reflected beam from an opposite direction, an objective lens 105 for condensing the light beam transmitted through the optical isolator 104 to form a small spot on an optical disk 106 serving as a recording medium and guiding the beam reflected by the optical disk 6 to the optical isolator 104, a reflected beam condenser unit 140 for condensing the reflected Beam from the optical isolator 104, an optical filter 110 for transmitting only the main beam in the reflected beam condensed by the reflected beam condenser unit 140, an optical signal detector 111 for detecting the reflected beam transmitted through the optical filter 110, and a focus error detection unit 112 for detecting a focus error on the basis of the reflected beam from the reflected beam condenser unit 140.

The reflected beam condenser unit 140 has a convex lens 107 for condensing the reflected beam from the optical isolator 104, a beam splitter 108 for transmitting the reflected beam from the convex lens 107, and at the same time, reflecting part of the light beam and guiding the light beam to the focus error detection unit 112, and a concave lens 109 for guiding the reflected beam transmitted through the beam splitter 108 to the optical filter 110.

The operation of this embodiment will be described below. A laser beam emitted from the semiconductor laser 101 is collimated by the collimator lens 102 and incident on the optical modulator 103. The light intensity or phase in the beam section is modulated. The laser beam is transmitted through the optical isolator 104 and condensed by the objective lens 105 to form a light spot on the information surface of the optical disk 106.

Figure 2:
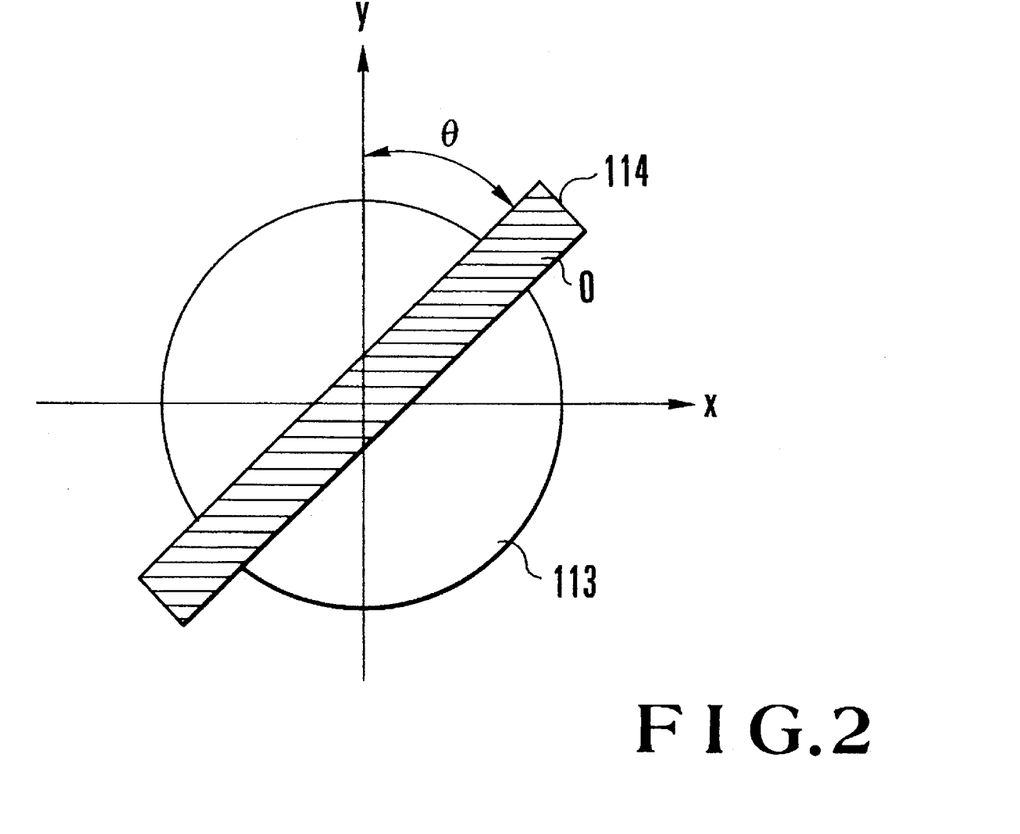
FIG. 2 is an explanatory view of the main part of an optical modulator shown in FIG. 1.
Figure 3A:
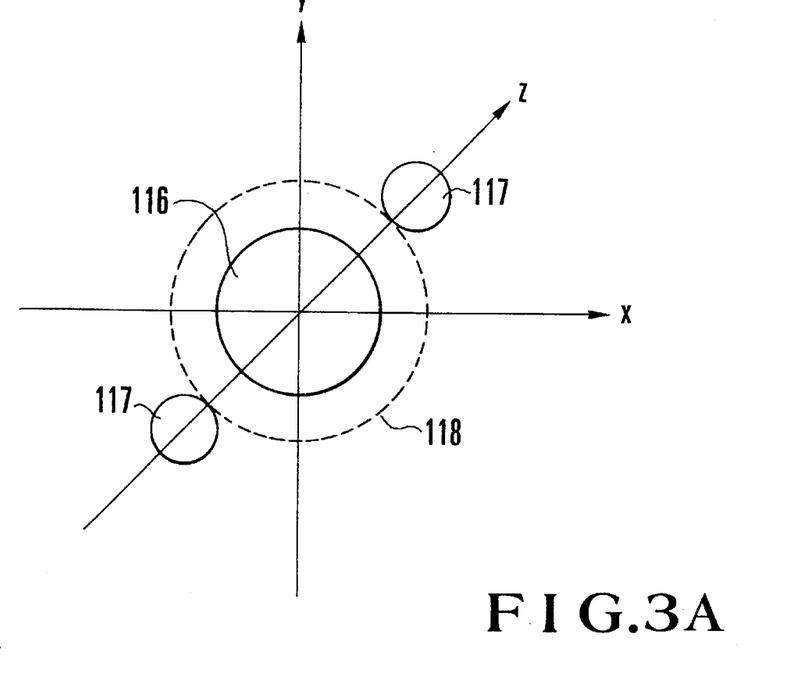
FIG. 3A is a view showing a main beam and side beams from the optical modulator shown in FIG. 2.

As shown in FIG. 2, when the optical modulator 103 decreases the light intensity near the center of a beam section 113 of the laser beam by shielding light by an elongated light-shielding plate 114 which is inclined by an angle θ with respect to the y-axis, a light spot 116 is formed by the main beam on the information surface of the optical disk 106, as shown in FIG. 3A. Light-shielding plate 114 may be reflective. The light spot is reduced in the x and y directions as compared to a light spot 118 obtained without using the optical modulator 103. In FIG. 3A, reference numeral 117 denotes side lobe light beams generated around the main beam 116. The side lobe light beams are generated on the same line as of the light-shielding plate 114.

The inclination angle θ of the light-shielding plate 114 is set to an optimum value in accordance with the line density and track pitch of the optical disk 106 to perform adjustment such that the side lobe light beams 117 do not irradiate pits before and behind the irradiation position of the main beam 116, or adjacent tracks. In this case, the optical modulator 103 modulates the light intensity. However, it may change the phase by π.

Figure 3B:
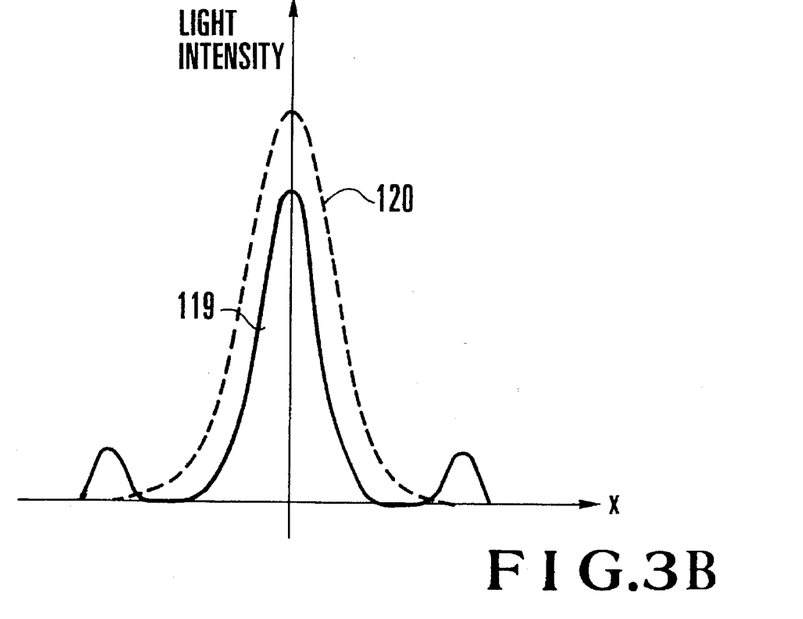
FIG. 3B is a graph showing the intensity distribution of the light beam from the optical modulator shown in FIG. 2.

The light intensity distribution on the z-section of the medium, which is obtained upon irradiation of the laser beam on the optical disk 106 through the objective lens 105, is indicated by a thick line 119 in FIG. 3B. At the same light intensity, the spot diameter can be made smaller than the diffraction limit value determined by the wavelength of the light source and the numerical aperture of the objective lens, as compared to a light intensity distribution 120 obtained without using the light-shielding plate 114.

The reflected light beam from the optical disk 106, which is obtained by the above light spot, is reflected by the optical isolator 104 and guided to a reproduction signal detection system. More specifically, the reflected light beam from the optical isolator 104 is transmitted through the convex lens 107 and incident on the beam splitter 108. Part of the light beam is transmitted and the remaining is reflected. The light beam reflected by the beam splitter 108 is guided to the focus error detection unit 112.

On the other hand, the reflected beam transmitted through the beam splitter 108 is re-condensed by the concave lens 109 and incident on the optical signal detector 111 through the optical filter 110 arranged at the re-condensation position. The optical filter 110 has one of structures shown in FIGS. 4A to 4D (to be described later) and transmits only the main beam 116 while removing the side lobe light beams 117. The optical signal detector 111 converts and outputs an electrical signal at a level corresponding to the light intensity of only the main beam 116, thereby reproducing information.

Figure 4A:
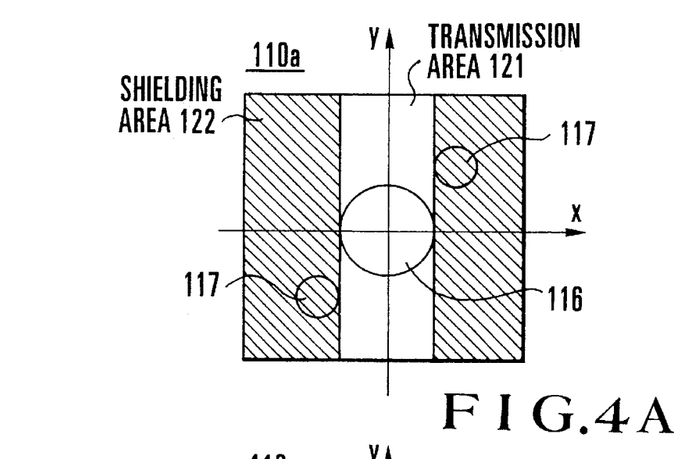
FIGS. 4A to 4D are views showing optical filters corresponding to the optical modulator shown in FIG. 2.
Figure 4B:
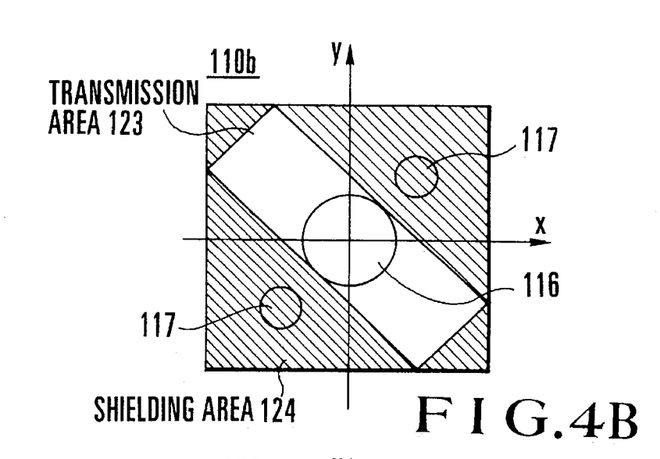

Examples of the optical filter 110 will be described below with reference to FIGS. 4A to 4D. FIGS. 4A and 4B show examples using, as the optical filters 110, slits formed to cross the light-shielding plates 114 of the optical modulators 103 at angles of 45° and 90°, respectively. The optical filter 110 shown in FIG. 4A is a slit 110a consisting of a transmission area 121 and a shielding area 122. The transmission area 121 is a rectangular area having a longitudinal direction parallel to the y-axis and a width for transmitting only the main beam 116 while shielding the side lobe light beams 117.

The optical filter 110 shown in FIG. 4B is a slit 110b consisting of a transmission area 123 and a shielding area 124. The transmission area 123 is a rectangular area having a longitudinal direction perpendicular to a line segment connecting the two side lobe light beams 117, i.e., the light-shielding plate 114, and a width for transmitting only the main beam 116 while shielding the side lobe light beams 117.

Figure 4C:
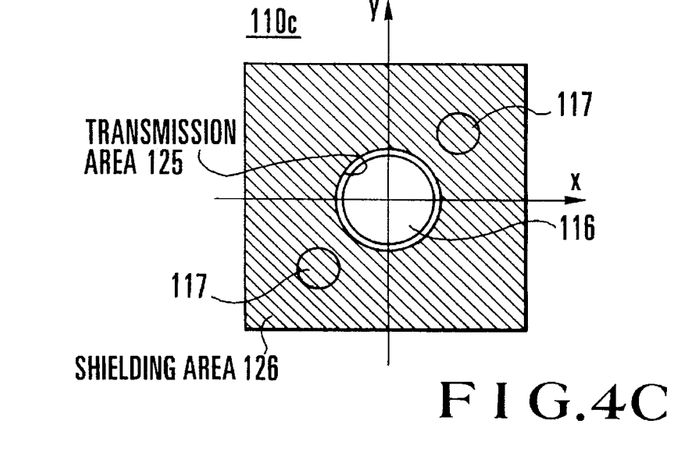
Figure 4D:
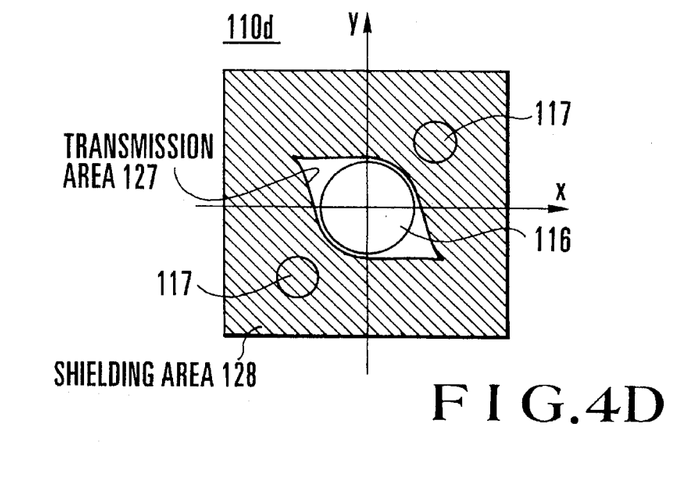

The optical filter 110 shown in FIG. 4C is a pinhole 110c having, at the center of a rectangular shielding area 126, a circular transmission area 125 for transmitting only the main beam 116. The optical filter 110 shown in FIG. 4D is a pinhole 110d having, at the center of a rectangular shielding area 128, a cat's-eye-shaped transmission area 127. The cat's-eye can be set in any direction as far as the side lobe light beams 117 are not incident on the optical signal detector 111.

All of the slits 110a and 110b and the pinholes 110c and 110d transmit the main beam 116 and shield the side lobe light beams 117. According to this embodiment, as shown in FIG. 3A, adjustment is performed by the optical modulator 103 such that the side lobe, light beams 117 do not irradiate the pits before and behind the irradiation position of the main beam 116, or adjacent tracks. Therefore, even when the optical filter 110 is not arranged, a light spot smaller than the diffraction limit value determined by the wavelength of the light source and the numerical aperture of the objective lens can be formed, and at the same time, recording/reproduction can be satisfactorily performed at a high density without generating noise. However, when the optical filter 110 is arranged, more satisfactory recording/reproduction can be performed without being influenced by noise.

Figures 5A, 5B, 5C, 5D:
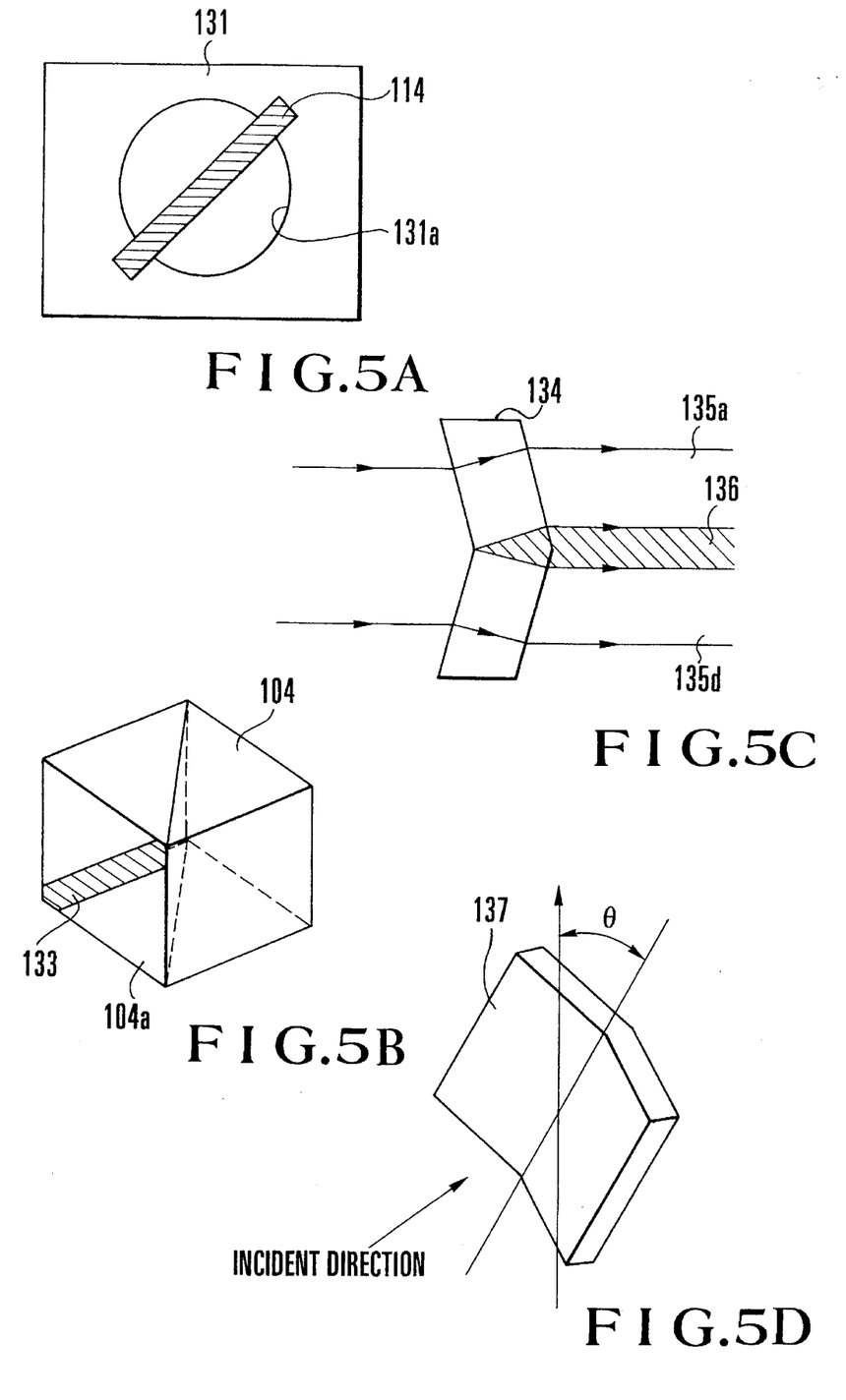
FIGS. 5A to 5D are views showing detailed examples of the optical modulator shown in FIG. 2.

Examples of the optical modulator 103 will be described below. An example of the optical modulator 3 is shown in FIG. 2, and another example will be described below with reference to FIGS. 5A to 5D. In FIG. 5A, the elongated light-shielding plate or the light-shielding strip 114 having an antireflection surface for incident light is fixed to a jig 131 having a central hole 131a.

In FIG. 5B, a light-shielding strip 133 inclined by an angle is formed as the optical modulator on a diagonal of a surface 104a of the optical isolator 104 on the collimator lens 102 side. FIG. 5C shows a beam splitting prism 134 for splitting one incident parallel light beam into two exit light beams 135a and 135b by an aphotic area 136 formed near the center of the exit surface.

When the beam splitting prism 134 is rotated by an angle θ, as indicated by reference numeral 137 in FIG. 5D, and used as the optical modulator 103, the aphotic area forms a strip-like area in the exit light beam section, and the strip-like light-shielding area rotated by the angle θ is formed, as shown in FIG. 2.

In this manner, in each of the examples of the optical modulator 103 shown in FIGS. 5A to 5D, a strip-like light-shielding area having a longitudinal direction inclined by the predetermined angle θ with respect to the vertical axis can be formed in the beam section of an incident light beam. The optical modulator 103 is not limited to the above examples. Even when modulation is performed to cause the incident light beam to exit with its phase being shifted by π, the light spot 116 and the spots 117 of the side beams can be formed on the information surface of the optical disk 106 in the arrangement as shown in FIG. 3A.

Figure 6:
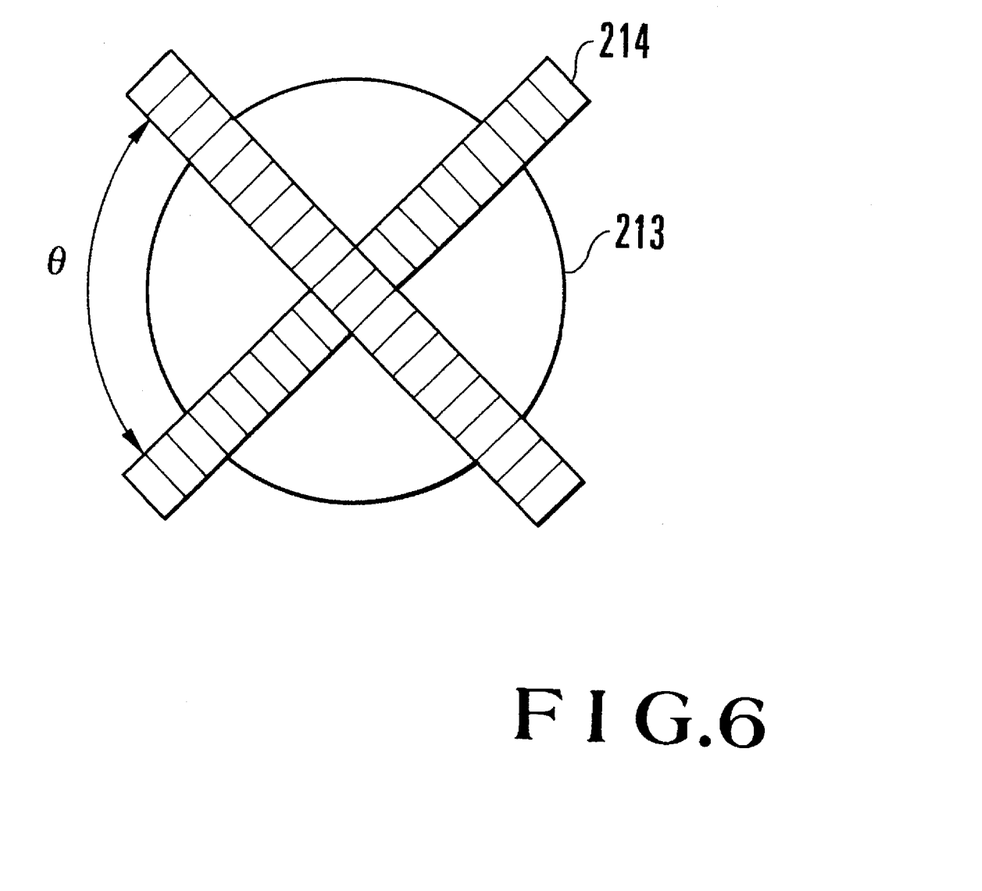
FIG. 6 is an explanatory view of the main part of an optical modulator in an optical head apparatus according to the second embodiment of the present invention.
Figure 9A:
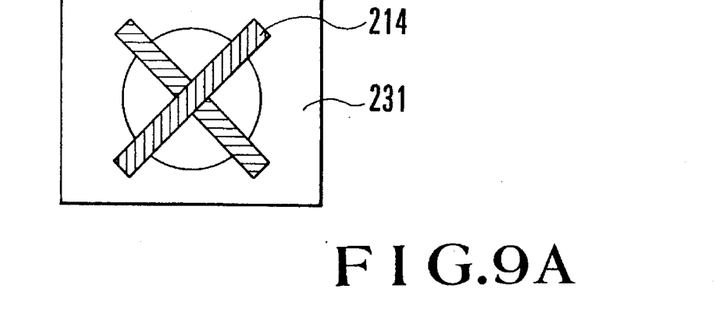
FIGS. 9A to 9D are views showing detailed examples of the optical modulator shown in FIG. 6.

An optical head apparatus according to the second embodiment of the present invention will be described below. The overall arrangement of the optical head apparatus is the same as in FIG. 1, and a detailed description thereof will be omitted. In this embodiment, an optical modulator 103 having a structure wherein elongated light-shielding plates 214 crossing each other in a cross shape are fixed to a jig 231 is used to decrease, near the center of a light beam section 213, the light intensity of a light beam from a collimator lens 102, as shown in FIGS. 6 and 9A.

Figure 7A:
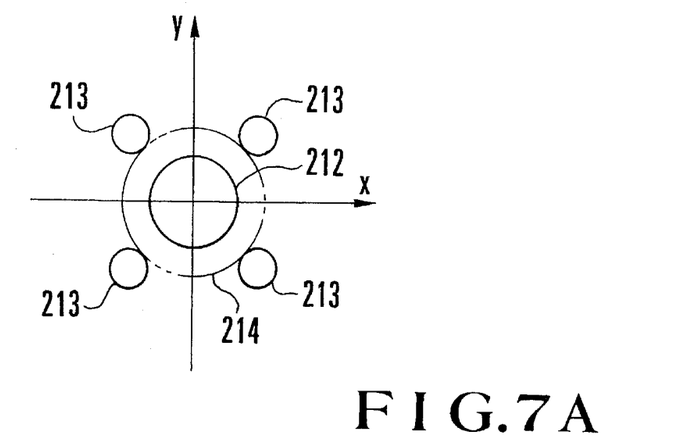
FIG. 7A is a view showing a main beam and side beams from the optical modulator shown in FIG. 6.

With this arrangement, from a beam irradiated on an optical disk 106 through an objective lens 105, a main beam 212 and side lobe light beams 213 are generated, as shown in FIG. 7A. The beam diameter of the main beam 212 can be made smaller than that of the beam 214 obtained without using the light-shielding plate 214.

Figure 7B:
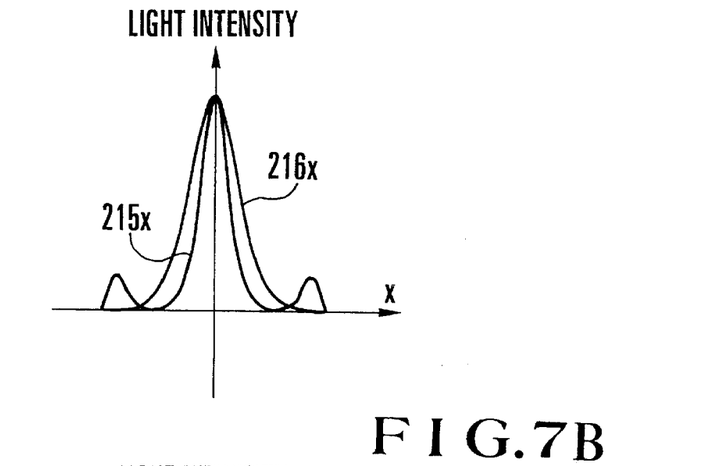
FIGS. 7B and 7C are graphs showing the x- and y-axis intensity distributions of the light beam from the optical modulator shown in FIG. 6.
Figure 7C:
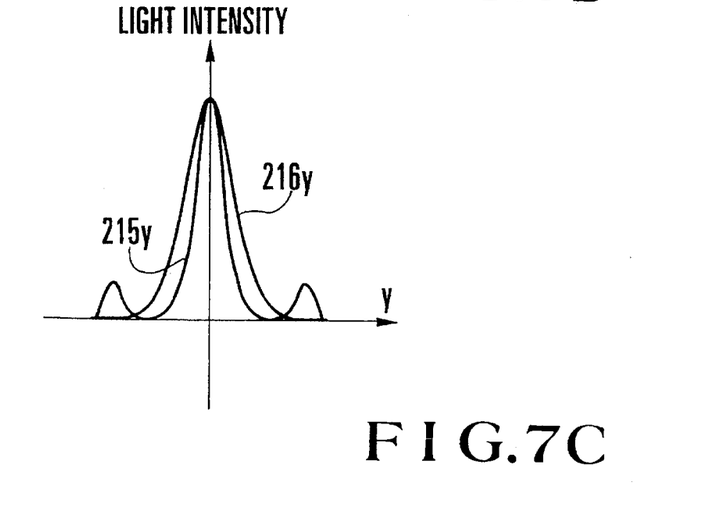

FIGS. 7B and 7C shows light intensity distributions in the x- and y-sections, respectively. Intensity distributions 215x and 215y in the x- and y-sections on the optical disk 106, which are obtained upon irradiation of a beam on the optical disk 106 through the objective lens 105, have a half-width smaller than that of intensity distributions 216x and 216y obtained without using the light-shielding plate 214.

That is, the beam diameter can be made smaller than the limit value determined by the wavelength of the light source and the numerical aperture of the condenser lens.

As shown in FIG. 6, a cross angle θ of the X shape formed by the light-shielding plates 214 is changed in accordance with the line density and track pitch of the recording medium and adjusted such that the side lobe light beams 213 do not irradiate pits before and behind the irradiation position of the main beam 212, or adjacent tracks, as shown in FIG. 7A.

Figure 9B:
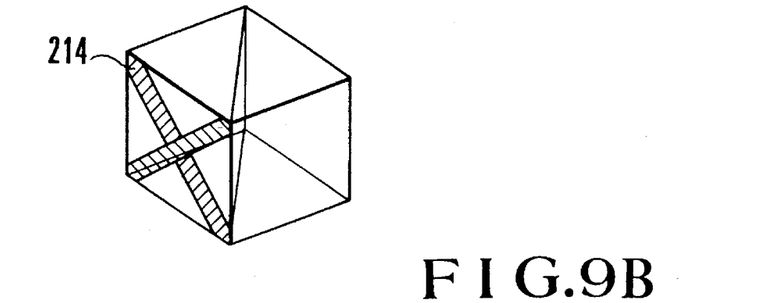

As the optical modulator 103, any device having the same function as that of the X-shaped light-shielding plates 214 can be used. Therefore, as shown in FIG. 9B, the X-shaped light-shielding plates 214 may be arranged on a surface of an optical isolator 104, on which the light beam from the collimator lens 102 is incident.

Figure 9C:
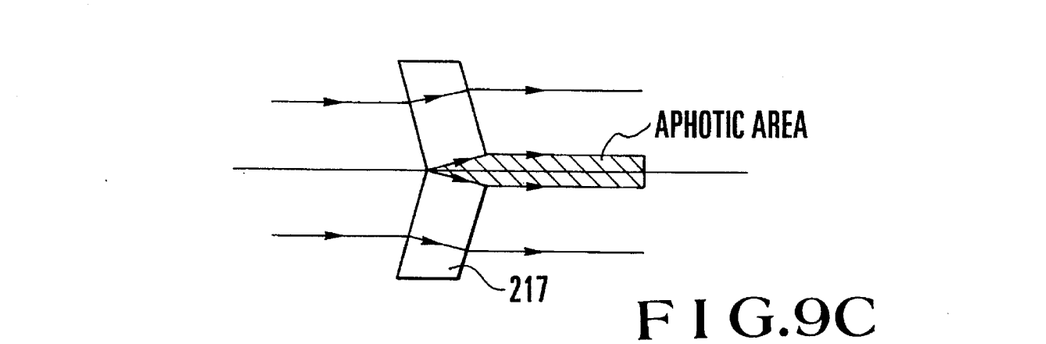
Figure 9D:
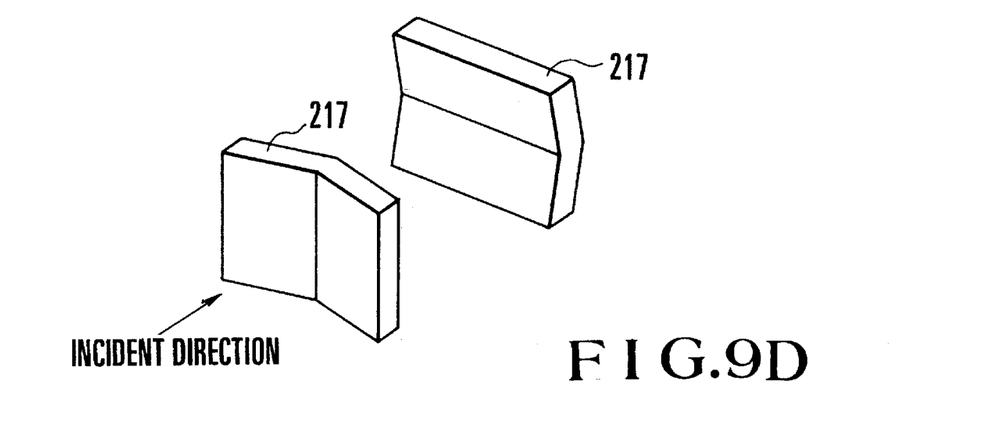

In addition, two beam splitting prisms 217 for splitting a light beam to generate an aphotic area near the center, as shown in FIG. 9C, can be used to realize the optical modulator 103, as shown in FIG. 9D. More specifically, the beam splitting prisms 217 are arranged such that the aphotic area forms an X shape in the beam section, as shown in FIG. 9D.

Figure 8A:
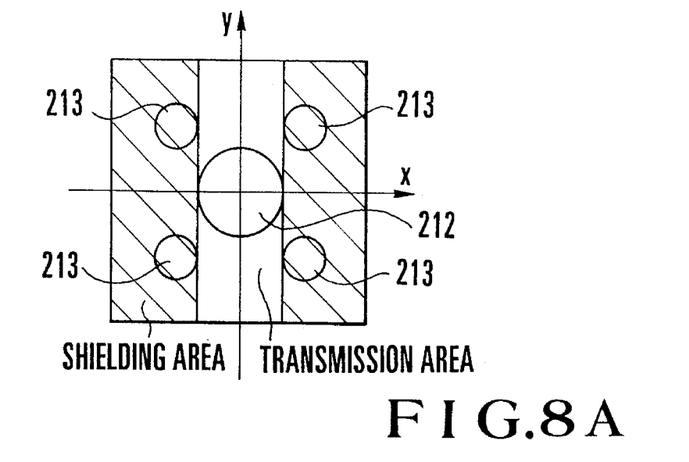
FIGS. 8A to 8C are views showing optical filters corresponding to the optical modulator shown in FIG. 6.
Figure 8B:
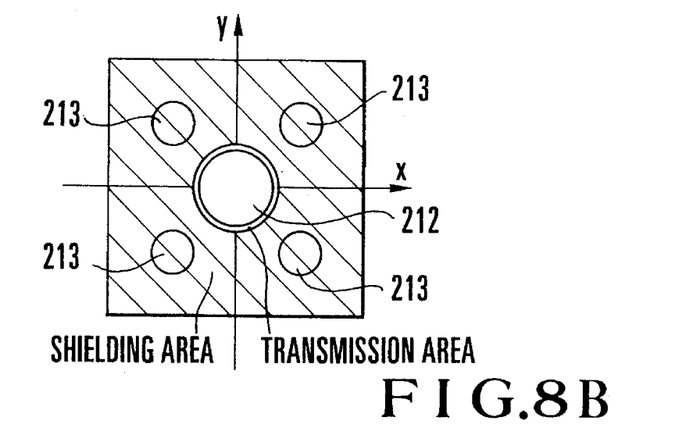
Figure 8C:
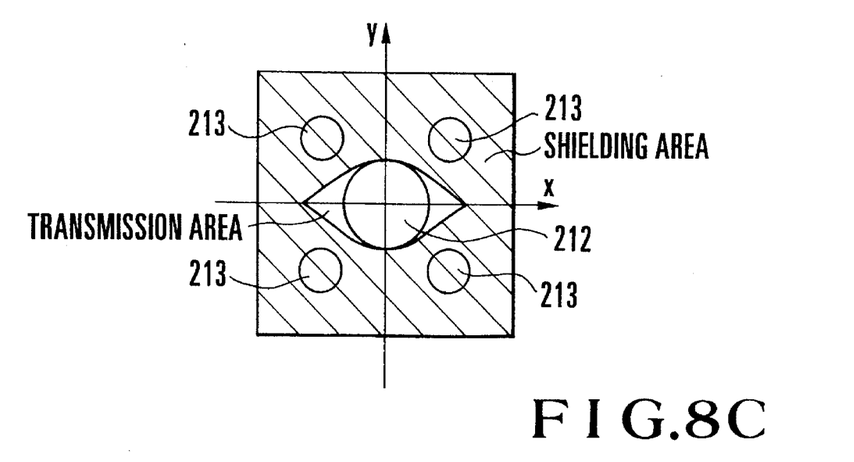

As an optical filter 110, as shown in FIGS. 8A to 8C, any device which prevents the side lobe light beams 213 from being incident on an optical signal detector 111 and transmits only the main beam 212 to the optical signal detector 111 can be used.

As shown in FIG. 8A, a slit having the same width as that of the main beam 212 can be used as the filter 110. The slit can be set in any direction as far as the side lobe light beams 213 can be prevented from being incident on the optical signal detector 111.

In addition, as shown in FIG. 8B, a pinhole having the same diameter as that of the main beam 212 can also be used as the filter 110.

Furthermore, as shown in FIG. 8C, the filter 110 having a cat's-eye-shaped transmission area with the main beam 212 at the position of an eye can also be used. The cat's eye can be set in any direction as far as the side lobe light beams 213 can be prevented from being incident on the optical signal detector 111.

As has been described above, according to the present invention, a light spot can be formed by the main beam on the recording medium while reducing the diameter as compared to the prior art. At the same time, side lobe light beams are formed at positions offset in both the track line direction and the track width direction. For this reason, the side lobe light beams can be prevented from being irradiated on pits before and behind the irradiation position where a light spot is formed by the main beam, or adjacent tracks, thereby largely decreasing noise caused by the influence of the side lobe light beams on the light spot formed by the main beam.

In addition, according to the present invention, an optical filter is used to transmit the main beam and shield the side lobe light beams. Therefore, noise caused by the side lobe light beams with respect to the main beam can be largely decreased. At the same time, assembly efficiency of the optical filter for removing the side lobe light beams, which has conventionally required two-dimensional position adjustment, can be improved.

What is claimed is:

1. An optical head apparatus comprising:

a light source for emitting a light beam;

optical modulation means for modulating one of a light intensity and a phase in a section of the light beam from said light source and controlling the position of a generated side lobe light beam, said optical modulation means having at least a first strip-like light-shielding area rotated about the light beam propagation direction by a first predetermined angle with respect to a vertical axis in the section of the light beam;

an objective lens for focusing the light beam from said optical modulation means to form a super-resolution light spot on a recording medium;

reflected beam condensing means for condensing a reflected beam from the small spot on said recording medium; and photodetection means for detecting the reflected beam from said reflected beam condensing means to reproduce information.

2. An apparatus according to claim 1, wherein said optical modulation means has an elongated light-shielding plate as the first light-shielding area.

3. An apparatus according to claim 1, wherein said optical modulation means has a second strip-like light-shielding area crossing the first light-shielding area near a center of the section of the light beam.

4. An apparatus according to claim 3, wherein said optical modulation means has X-shaped light-shielding plates as the first and second light-shielding areas.

5. An apparatus according to claim 1, wherein said optical modulation means is constituted by a light intensity modulator for modulating the intensity of the light beam from the laser source.

6. An apparatus according to claim 1, wherein said optical modulation means is constituted by a light phase modulator for modulating the light beam from said laser source such that a phase difference between incident light and exit light becomes $\pi$.

7. An apparatus according to claim 1, further comprising an optical filter, arranged between said reflected beam condensing means and said photodetection means, for shielding the side lobe light beams of the reflected beam from said reflected beam condensing means.

8. An apparatus according to claim 7, wherein said optical filter has a slit-like transmission area crossing the first light-shielding area of said optical modulation means at a second predetermined angle.

9. An apparatus according to claim 8, wherein the first light-shielding area of said optical modulation means is inclined by 45° with respect to the vertical axis as the first predetermined angle, and the transmission area of said optical filter crosses the first light-shielding area at a pitch corresponding to an integer multiple of 45° as the second predetermined angle.

10. An apparatus according to claim 7, wherein said optical filter has a pinhole-like transmission area substantially matching the section of the light beam.

11. An optical head apparatus comprising:

a laser source for emitting a laser beam as a light beam;

optical modulation means for modulating one of a light intensity and a phase in a section of the light beam from said laser source and controlling the position of a generated side lobe light beam, said optical modulation means having an elongated reflecting plate rotated about the light beam propagation direction by a predetermined angle with respect to a vertical axis in the section of the light beam;

an objective lens for focusing the light beam from said optical modulation means to form a super-resolution light spot on a recording medium;

reflected beam condensing means for condensing a reflected beam from the small spot on said recording medium;

an optical filter for transmitting a main beam of the reflected beam from said reflected beam condensing means and shielding the side lobe light beam; and photodetection means for detecting the reflected beam from said optical filter to reproduce information.

12. An optical head apparatus comprising:

a laser source for emitting a laser beam as a light beam;

optical modulation means for modulating one of a light intensity and a phase in a section of the light beam from said laser source and controlling the position of a generated side lobe light beam, said optical modulation means having X-shaped reflecting plates crossing each other near a center of the section of the light beam;

an objective lens for focusing the light beam from said optical modulation means to form a super-resolution light spot on a recording medium;

reflected beam condensing means for condensing a reflected beam from the small spot on said recording medium;

an optical filter for transmitting a main beam of the reflected beam from said reflected beam condensing means and shielding the side lobe light beam; and photodetection means for detecting the reflected beam from said optical filter to reproduce information.

* * * * *